(12) United States Patent
Barkan et al.

(10) Patent No.: US 12,112,517 B2
(45) Date of Patent: Oct. 8, 2024

(54) DIAGNOSTIC TOOL FOR DEEP LEARNING SIMILARITY MODELS

(71) Applicant: Microsoft Technology Licensing, LLC, Redmond, WA (US)

(72) Inventors: Oren Barkan, Tel Aviv (IL); Omri Armstrong, Tel Aviv (IL); Ori Katz, Tel Aviv (IL); Noam Koenigstein, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/353,045

(22) Filed: Jul. 14, 2023

(65) Prior Publication Data

US 2024/0029393 A1 Jan. 25, 2024

Related U.S. Application Data

(63) Continuation of application No. 18/052,568, filed on Nov. 3, 2022, now Pat. No. 11,769,315, which is a continuation of application No. 17/084,468, filed on Oct. 29, 2020, now Pat. No. 11,532,147.

(60) Provisional application No. 63/083,712, filed on Sep. 25, 2020.

(51) Int. Cl.
| | |
|---|---|
| *G06V 10/46* | (2022.01) |
| *G06F 18/2113* | (2023.01) |
| *G06F 18/22* | (2023.01) |
| *G06N 3/08* | (2023.01) |
| *G06V 10/25* | (2022.01) |

(52) U.S. Cl.
CPC ........ *G06V 10/464* (2022.01); *G06F 18/2113* (2023.01); *G06F 18/22* (2023.01); *G06N 3/08* (2013.01); *G06V 10/25* (2022.01)

(58) Field of Classification Search
CPC .... G06V 10/464; G06V 10/25; G06K 9/6201; G06K 9/623; G06N 3/08; G06F 18/22; G06F 18/2113
See application file for complete search history.

(56) References Cited

U.S. PATENT DOCUMENTS

| | | | |
|---|---|---|---|
| 9,396,415 B2* | 7/2016 | Chertok | G06V 10/426 |
| 10,262,226 B1* | 4/2019 | Flowers | G06V 10/764 |
| 10,366,300 B1* | 7/2019 | Flowers | G06V 20/597 |
| 10,678,508 B2* | 6/2020 | Vantrease | G06F 7/5095 |
| 11,132,797 B2* | 9/2021 | Mao | G06T 11/008 |
| 11,379,985 B2* | 7/2022 | Wang | G06N 3/08 |
| 11,516,473 B2* | 11/2022 | Chong | G06N 3/084 |
| 11,809,519 B2* | 11/2023 | Jang | G06N 3/084 |

(Continued)

*Primary Examiner* — Manav Seth
(74) *Attorney, Agent, or Firm* — Foley IP Law, PLLC

(57) ABSTRACT

A diagnostic tool for deep learning similarity models and image classifiers provides valuable insight into neural network decision-making. A disclosed solution generates a saliency map by: receiving a test image; determining, with an image classifier, an image classification of the test image; determining, for the test image, a first activation map for at least one model layer using the determined image classification; determining, for the test image, a first gradient map for the at least one model layer using the determined image classification; and generating a first saliency map as an element-wise function of the first activation map and the first gradient map.

20 Claims, 8 Drawing Sheets

(56) References Cited

U.S. PATENT DOCUMENTS

2018/0165548 A1\* 6/2018 Wang .................... G06F 18/214
2020/0026987 A1\* 1/2020 Gudla .................... G06F 17/16

\* cited by examiner

DIAGNOSTIC TOOL FOR DEEP LEARNING SIMILARITY MODELS

CROSS-REFERENCE TO RELATED APPLICATION

This application is a continuation application of and claims priority to U.S. patent application Ser. No. 18/052,568, entitled "DIAGNOSTIC TOOL FOR DEEP LEARNING SIMILARITY MODELS," filed on Nov. 3, 2022 which is a continuation of and claims priority to U.S. patent application Ser. No. 17/084,468, entitled "DIAGNOSTIC TOOL FOR DEEP LEARNING SIMILARITY MODELS," filed on Oct. 29, 2020, which claims priority to U.S. Provisional Patent Application No. 63/083,712, entitled "DIAGNOSTIC TOOL FOR DEEP LEARNING SIMILARITY MODELS," filed on Sep. 25, 2020, the disclosures of which are incorporated herein by reference in their entireties.

BACKGROUND

Computer vision applications often use machine learning (ML) models in which images are fed into convolutional neural networks (CNNs) that make decisions regarding the images, such as similarities between two images, classification of the images, detection of objects within the images, tracking objects that persist within a sequence of images, and other applications. Because these are often deep learning models (e.g., 50 layers) that were trained using a series of labeled (tagged) images, ML-based decisions are largely viewed as "black box" processes. As a result, decisions by ML models may be left unexplained.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A diagnostic tool for deep learning similarity models and image classifiers provides valuable insight into neural network decision-making. A disclosed solution generates a saliency map by: receiving a baseline image and a test image; determining, with a convolutional neural network (CNN), a first similarity between the baseline image and the test image; based on at least determining the first similarity, determining, for the test image, a first activation map for at least one CNN layer; based on at least determining the first similarity, determining, for the test image, a first gradient map for the at least one CNN layer; and generating a first saliency map as an element-wise function of the first activation map and the first gradient map. Some examples further determine a region of interest (ROI) in the first saliency map, cropping the test image to an area corresponding to the ROI, and determine a refined similarity score.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

A diagnostic tool for deep learning similarity models provides valuable insight into neural network decision-making. A disclosed solution generates a saliency map by: receiving a baseline image and a test image; determining, with a convolutional neural network (CNN), a first similarity between the baseline image and the test image; based on at least determining the first similarity, determining, for the test image, a first activation map for at least one CNN layer; based on at least determining the first similarity, determining, for the test image, a first gradient map for the at least one CNN layer; and generating a first saliency map as an element-wise function of the first activation map and the first gradient map. Some examples further determine a region of interest (ROI) in the first saliency map, cropping the test image to an area corresponding to the ROI, and determine a refined similarity score. Some examples may further be applied to image classifiers.

Aspects of the disclosure operate in an unconventional manner by generating a saliency map as an element-wise function of an activation map and a gradient map. Some examples further generate a composite saliency map as an element-wise function of the saliency maps for different layers of the CNN. A saliency map is an image that shows each pixel's contribution to an output, and may be used to provide a representation of a complex process in a format that may be meaningful for analysis by providing localization of significant information. Similarity models produce a similarity score between two given signals that quantify a similarity of two signals (e.g., images) as an objective, repeatable metric.

Figure 4:
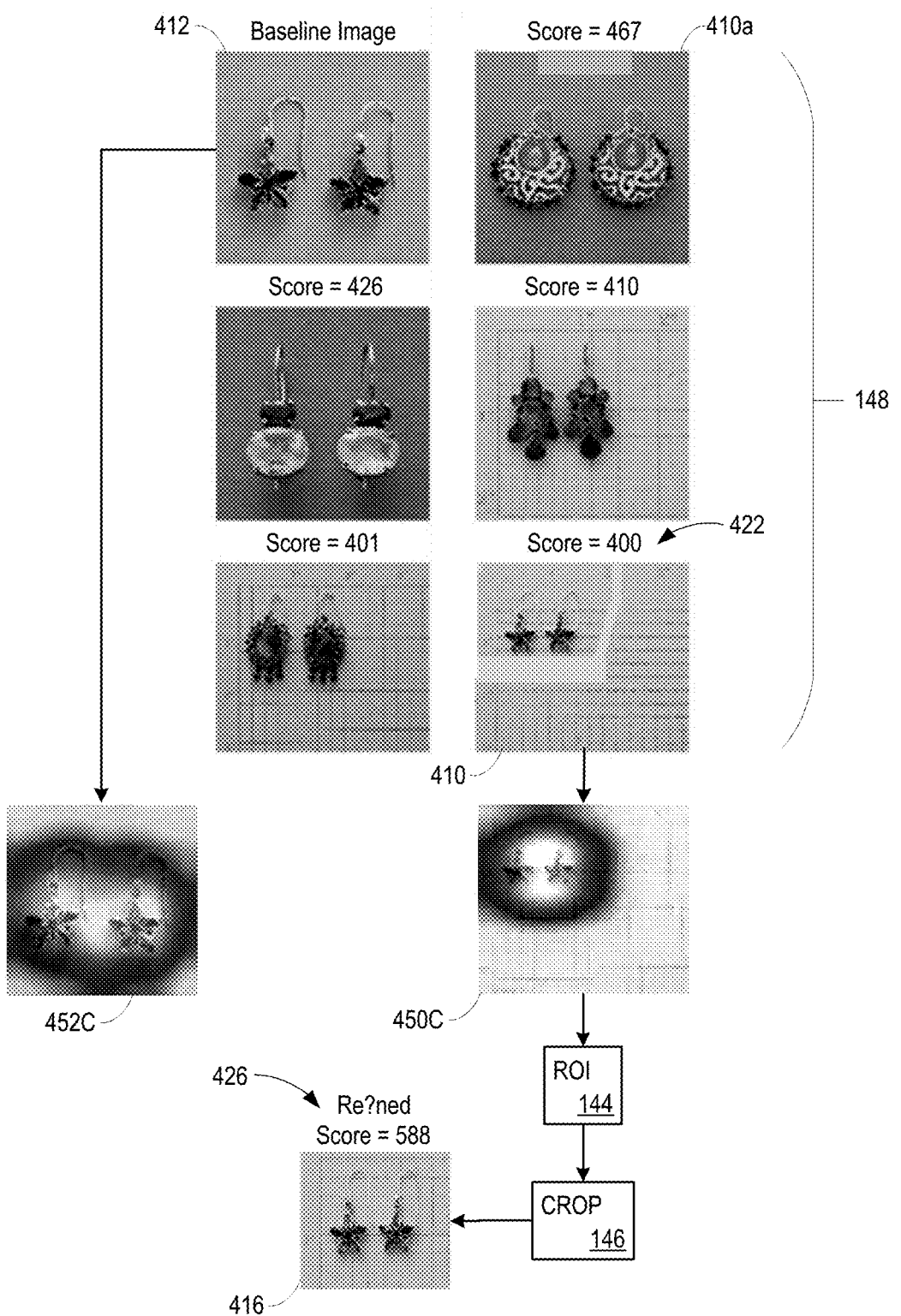
FIG. 4 also shows various images used and generated by the tool of FIG. 1, illustrating the improvement (refinement) of ranking a set of images relative to a reference image.

Aspects of the invention provide practical results, such as diagnostic images see FIG. 4) that explain machine learning (ML) decision-making, in order to enable assessment of the quality of the decisions. Such a diagnostic capability may be used to improve training data and also improve input data. For example, aspects of the invention provide further practical results by determining an ROI in a saliency map, so that an input image may be cropped to an area corresponding to the ROI. Determining a refined similarity score, using the cropped input image, produces a higher quality, more meaningful score. Such an operation may improve ranking results when a plurality of input images is ranked by similarity relative to a baseline (reference) image.

Thus, the disclosure enables finding which parts of input images contribute the most to a similarity score produced by a similarity model, thereby providing for an explanation of how the similarity model determines similarity (e.g., which features were most heavily relied upon in the decision). External information such as item label, category, color and other metadata may be improved in training data, enhancing subsequent performance of the ML model. Critical ML decision-making may be assessed for reliability and quality, using the disclosed diagnostic tool. An ML model operates most reliably when the basis of the decision-making is sound. Determining the ROI that is responsible for the score, and identifying the significant factors that are responsible for the score, may assist in enhancing and debugging the model.

Figure 1:
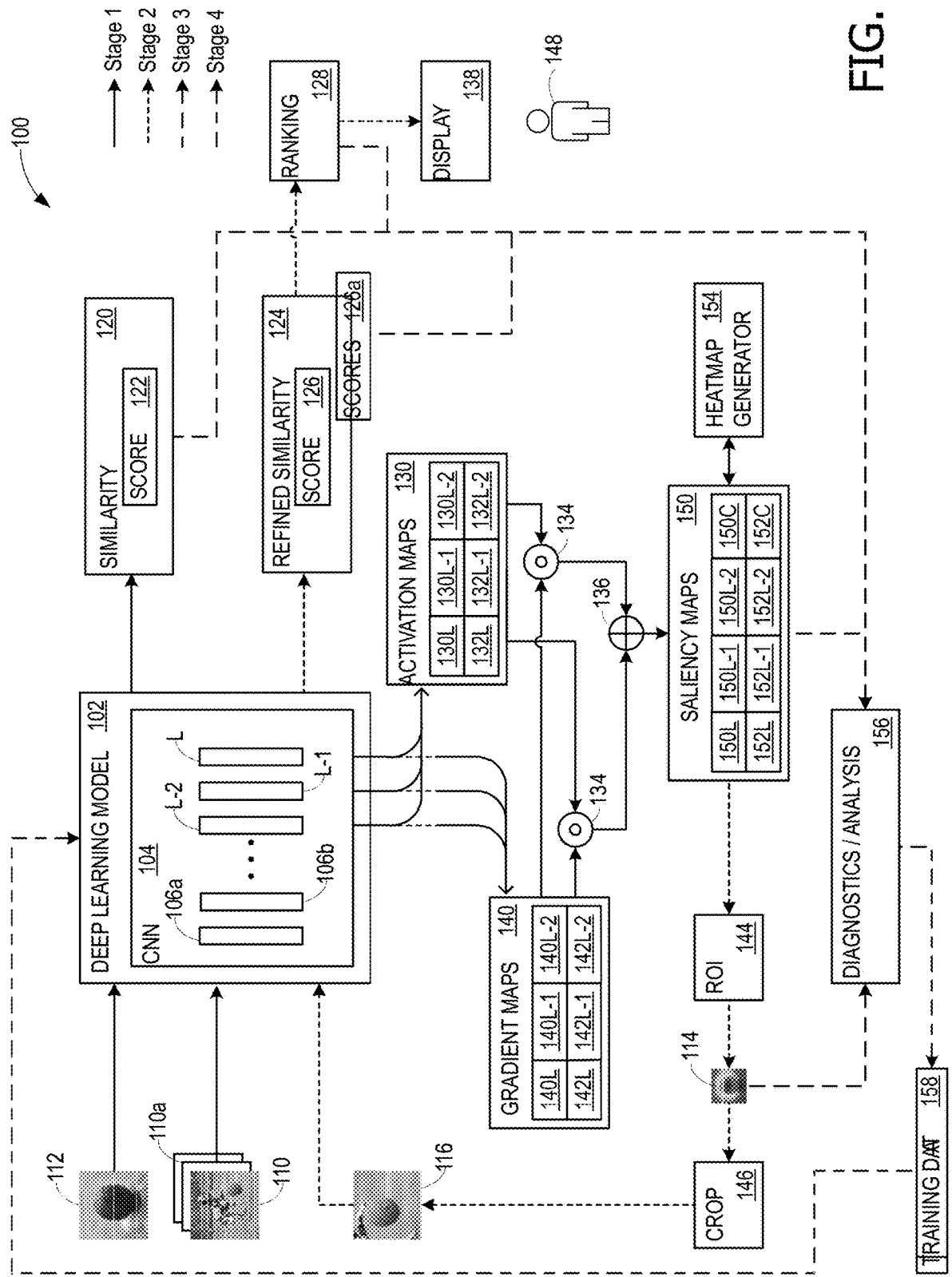
FIG. 1 illustrates a diagnostic tool for deep learning similarity models.

FIG. 1 illustrates a diagnostic tool 100 for deep learning similarity models, although some examples of diagnostic tool 100 may operate on classification models. The operations of diagnostic tool 100 will be explained in relation to four stages of data flows and calculations, indicated by a solid line (stage 1), a dotted line (stage 2), a dashed line (stage 3), and a dash-dot line (stage 4). A deep learning model 102 comprises a CNN 104, and may comprise a similarity model or another ML model. In some examples, CNN 104 comprises 50 layers or more, and may be a residual CNN. CNN 104 is illustrated as having an input layer 106a, a first hidden layer 106b, a final hidden layer L (which may be prior to an output layer), a penultimate (second from final) layer L-1, and an inner layer L-2 that is prior to penultimate hidden layer L-1. Layers L, L-1, and L-2 may be located elsewhere within CNN 104. For clarity, additional layers are not illustrated. Deep learning model 102 develops its decision-making by training, and a common theory is that early layers pick up basic shapes and later layers provide context to those shapes, such as size and placement.

Deep learning model 102 receives a baseline image 112 and a test image 110, and in some scenarios, also receives a plurality of additional test images 110a. In some examples, the images are 256×256 pixels. Deep learning model 102 initially determines (with CNN 104) a first similarity 120 between baseline image 112 and test image 110. In some examples, first similarity 120 is a scalar first similarity score 122, although, in some examples, first similarity 120 may contain additional information beyond scalar first similarity score 122. In similarity tasks, two images X and Y are mapped to vectors and assigned a similarity score $S(F_X, F_Y)$. A common practice is to use cosine similarity or dot product, or an inner product (or other function) for S. In some examples, the representation produced by F is not necessarily taken from the last hidden layer of the network. Therefore, F may be either one of the (non-convolutional) hidden layers, or even another layer that outputs scores.

Activation maps 130 and gradient maps 140 are generated from the process of determining first similarity 120 (e.g., based on at least determining first similarity 120). During the process of determining first similarity 120, various neurons within CNN 104 are activated, enabling the determination of one or more of activation maps 130. For example, activation maps of layers L, L-1 and L-2 are saved for both test image 110 and baseline image 112. In the illustrated example, activation map 130L is for layer L with test image 110, activation map 130L-1 is for layer L-1 with test image 110, activation map 130L-2 is for layer L-2 with test image 110, activation map 132L is for layer L with baseline image 112, activation map 132L-1 is for layer L-1 with baseline image 112, and activation map 132L-2 is for layer L-2 with baseline image 112. Activation maps 130 (e.g., activation maps 130L, 130L-1, 130L-2, 132L, 132L-1, 13L-2, and activation maps for other layers) are determined with a forward pass-through CNN 104. In general, activation is independent of scoring.

Determination of gradient maps 140 may occur in a reverse direction through CNN 104. In some examples, gradient maps of layers L, L-1 and L-2 are determined for both test image 110 and baseline image 112. In the illustrated example, gradient map 140L is for layer L with test image 110, gradient map 140L-1 is for layer L-1 with test image 110, gradient map 140L-2 is for layer L-2 with test image 110, gradient map 142L is for layer L with baseline image 112, gradient map 142L-1 is for layer L-1 with baseline image 112, and gradient map 142L-2 is for layer L-2 with baseline image 112. A gradient map indicates the contribution of a pixel to the score. For example, if a given pixel is intensified and the score increases, this is a positive gradient. Gradient intensity is preserved in gradient maps 140. Further details are provided below.

Combining one of activation maps 130 with the corresponding one of gradient maps 140, using a combination function 134, produces one of saliency maps 150. In some examples, saliency maps of layers L, L-1 and L-2 are generated for both test image 110 and baseline image 112. In the illustrated example, saliency map 150L is for layer L with test image 110, saliency map 150L-1 is for layer L-1 with test image 110, saliency map 150L-2 is for layer L-2 with test image 110, saliency map 152L is for layer L with baseline image 112, saliency map 152L-1 is for layer L-1 with baseline image 112, and saliency map 152L-2 is for layer L-2 with baseline image 112. Saliency map 150L is produced by the combination of activation map 130L and gradient map 140L, saliency map 150L-1 is produced by the combination of activation map 130L-1 and gradient map 140L-1, saliency map 150L-2 is produced by the combination of activation map 130L-2 and gradient map 140L-2, saliency map 152L is produced by the combination of activation map 132L and gradient map 142L, saliency map 152L-1 is produced by the combination of activation map 132L-1 and gradient map 142L-1, and saliency map 152L-2 is produced by the combination of activation map 132L-2 and gradient map 142L-2. In some examples, the combination of activation and gradient maps is performed using combination function 134. In some examples, combination function 134 comprises an element-wise combination of an activation map and the corresponding gradient map, and may comprise a Hadamard product. A Hadamard product is a binary operation that takes two matrices of the same dimensions and produces another matrix of the same dimension as the operands, where each element is the product of the corresponding elements of the original two matrices. Other functions may also be used, in some examples.

When saliency maps are created for multiple layers, those saliency maps may be combined into a composite saliency map using a combination function 136. In some examples, combination function 136 is an element-wise combination of one saliency map with one or more other saliency maps, and may comprise an element-wise summation. For example, composite saliency map 150C may be an element-wise combination of any two (or more) saliency maps 150L, 150L-1, 150L-2 and/or maps for other layers, and composite saliency map 152C may be an element-wise combination of any two (or more) saliency maps 152L, 152L-1, 152L-2 and/or maps for other layers. Other functions may also be used, in some examples. In general, a saliency map for a later layer produces a larger ROI than does a saliency map for an earlier layer. Thus, a composite saliency map (e.g., saliency map 150C or 152C) may have a more tightly-focused ROI than a saliency map for only a single final hidden layer (e.g., saliency map 150L or 152L).

Further detail regarding an exemplary generation of a saliency map is provided. Given an image X, the $l^{th}$ saliency map is denoted as:

$$m_X^l \in \mathbb{R}^{m_0 \times n_0} \quad \text{Eq. (1)}$$

$$m_X^l \triangleq m(h_X^l, g_X^l) \quad \text{Eq. (2)}$$

where h is an activation map (e.g., one of activation maps 130), g is a gradient map (e.g., one of gradient maps 140), and m is a saliency map (e.g., one of saliency maps 150). The gradient maps, g, are defined and denoted (where S is the similarity score) as:

$$g_X^l \triangleq \frac{\partial S}{\partial_X^l} \quad \text{Eq. (3)}$$

$$g_X^{lk} \triangleq g_X^l[k] \quad \text{Eq. (4)}$$

Saliency maps are implemented as:

$$m(h_X^l, g_X^l) = NRM[RSZ[\Sigma_{k=1}^{C_l} \phi(h_X^{lk}) \cdot \phi(g_X^{lk})^P]] \quad \text{Eq. (5)}$$

where $\phi$ is a rectified linear unit (ReLU) activation function and · is a Hadamard product. The ReLU function returns 0 for negative arguments, but returns the argument itself for positive values. The power operation is element-wise with a predetermined parameter ρ (applied after the ReLU activation). RSZ denotes the operation of resizing to a matrix of size $m_0$ by $n_0$ (e.g., the height and width of the original image X). NRM denotes min-max normalization to the interval [0, 1].

One motivation behind Eq. (5) is as follows: Each filter k in the $l^{th}$ convolutional layer captures a specific pattern. Therefore, it may be expected that $h_X^{lk}$ to have high (low) values in regions that (do not) correlate with the $k^{th}$ filter. In addition, regions in $g_X^{lk}$ that receive positive (negative) values indicate that increasing the value of the same regions in $h_X^{lk}$ will increase (decrease) the value of S.

This highlights pixels that are both positively activated and associated with positive gradients. Thus, all negative gradients are truncated using ReLU. Then, (optionally) the positive regions in the gradient map $g_X^{lk}$ are emphasized using the power operation (with ρ≥1). For example, setting ρ=2 may yield desirable results. Next, negative values in the activation map $h_X^{lk}$ are truncated and multiplied (element-wise) by the truncated and emphasized gradient map. This ensures that only pixels associated with both positive activation and gradients are preserved. Saliency maps are summed across the channel (filter) axis to aggregate saliency per pixel from all channels in the $l^{th}$ layer. The $l^{th}$ saliency map $l^{th}$ $m_X^l$ is obtained by resizing (e.g., via bi-cubic interpolation) to the original image spatial dimensions followed by min-max normalization. The final saliency map is $$m_X \triangleq z(\{m_X^l\}_{l=1}^L) \quad \text{Eq. (6)}$$

and is computed based on a pooling function z. Two different pooling functions may be used. For the final layer only:

$$z(\{m_X^l\}_{l=1}^L) = m_X^L \quad \text{Eq. (7)}$$

For a summation of the final two layers:

$$z(\{m_X^l\}_{l=1}^L) = m_X^{L-1} + m_X^L \quad \text{Eq. (8)}$$

Any of saliency maps 150 may be represented as a heatmap, which may be the same size as baseline image 112 and/or test image 110. In a heatmap, the value of a pixel is represented by a color, such as red for the highest values and blue for the lowest values. A heatmap generator 154 colors the pixels of any saliency map that is to be output as an image, although saliency maps 150 may be instead used as matrices (rather than images) for some processes. At this point, diagnostic tool 100 has provided an output that is valuable for multiple uses.

For example, saliency map150C may be sent to ROI calculator 144 to extract ROI 114 from saliency map150C. ROI 114 indicates the portion of test image 110 that was responsible for similarity score 122. ROI 114 is used by cropping function 146, to produce a cropped test image 116 that shows a portion of test image 110, such as an area corresponding to ROI 114 in saliency map150C. Cropped test image 116 is the received by deep learning model 102 (and CNN 104) and used to determine a refined similarity 124. In some examples, refined similarity 124 is a scalar refined similarity score 126, although, in some examples, refined similarity 124 may contain additional information beyond scalar refined similarity score 126. In some examples, this process is repeated for each of the additional test images 110a, to produce a plurality of scores 126a. In some examples, scores 126a include initial similarity scores, refined similarity scores, or both.

In some examples, such as in an e-commerce example, refined similarity score 126 and scores 126a (additional test images 110a) are sent to a ranking calculator 128 that is able to rank test image 110 (or cropped test image 116) relative to additional test images 110a. The ranking results are used to display test image 110 (or cropped test image 116) and additional test images 110a to a customer 148, on a display 138, according to the ranking. An example with further detail is shown in FIG. 4.

Additional value from diagnostic tool 100 may be realized using a diagnostic function 156 that provides for analysis of the operation of deep learning model 102, specifically of CNN 104. Any of saliency maps 150 may be sent to diagnostic function 156, along with ROI 114, and/or image ranking results from ranking calculator 128. In some examples, a comparison of similarity score 122 with refined similarity score 126, demonstrating the improvement of refined similarity score 126 over original similarity score 122 may provide insight into the operation of CNN 104. Insights obtained by diagnostic function 156 (end/or human users of diagnostic tool 100) may be used to improve training data in a training data 158 that further improves the performance of deep learning model 102.

Figure 2:
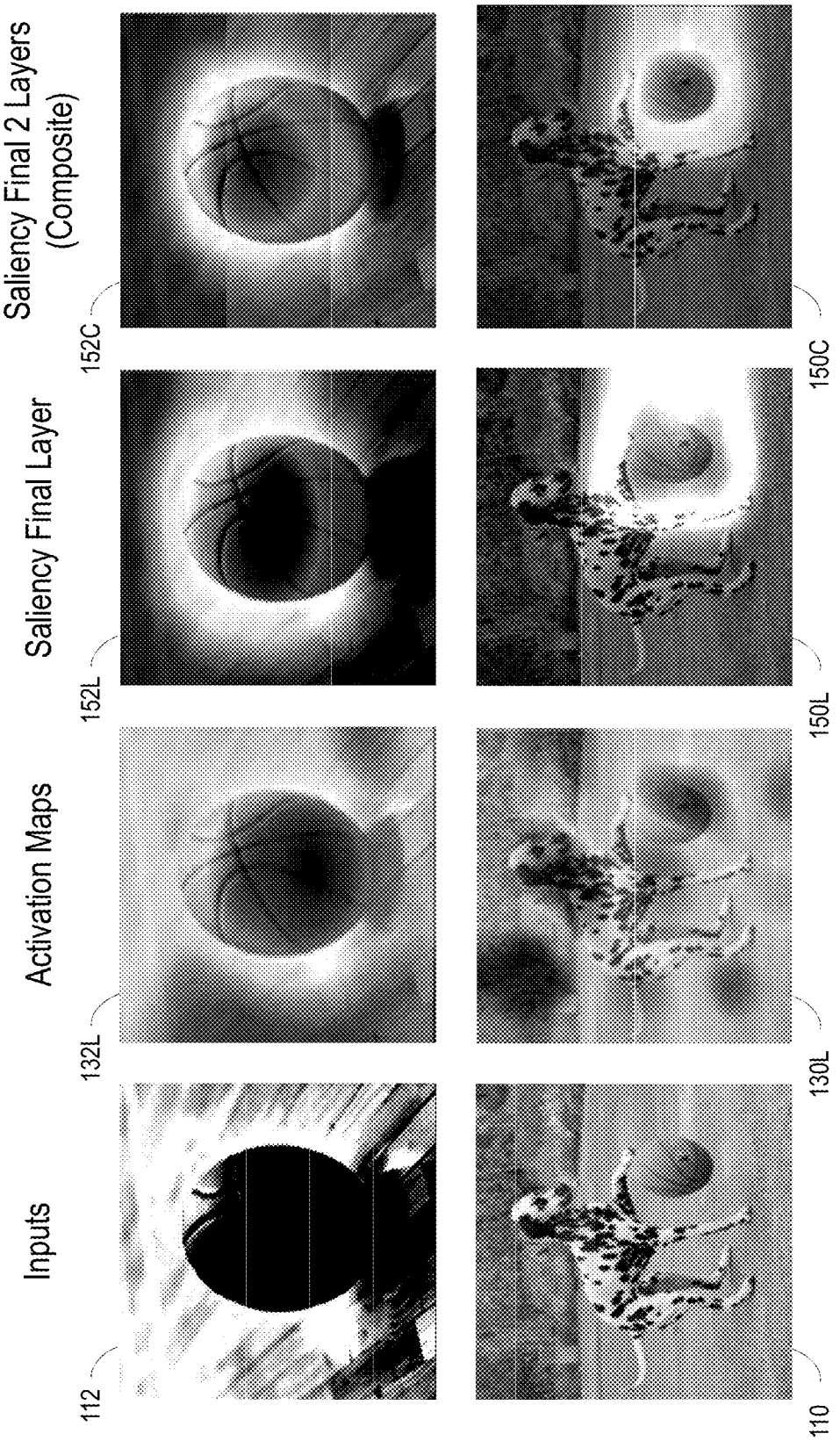
FIG. 2 shows various images used and generated by the tool of FIG. 1, illustrating the generation of saliency maps in a similarity process.

FIG. 2 shows various images used and generated by diagnostic tool 100. Baseline image 112 is shown along with its activation map 132L, saliency map 152L (for final hidden layer L) and composite saliency map 152C (for final two layers L and L-1). For comparison, test image 110 is also shown along with its activation map 130L, saliency map 150L (for final hidden layer L) and composite saliency map 150C (for final two layers L and L-1). Activation map 130L picks up the dog's head, but does not contribute to the score. Adding in the gradient maps focuses the saliency maps on the basketball. As can be seen by comparing saliency map 150C with saliency map 152C and baseline image 112, it is the basketball, rather than the dog, that drives the similarity result.

Figure 3:
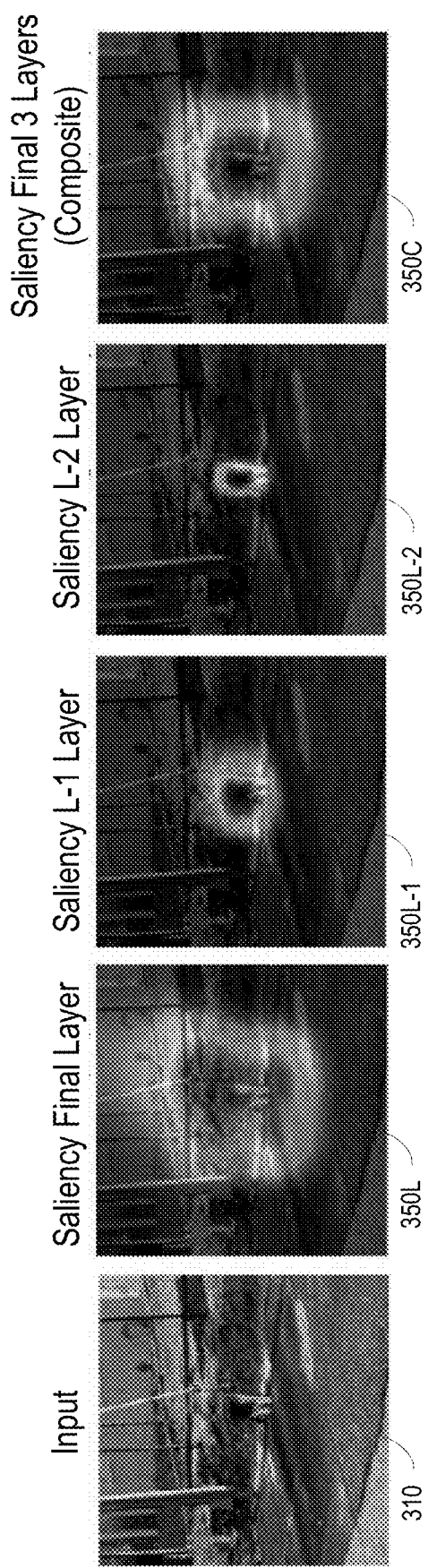
FIG. 3 also shows various images used and generated by the tool of FIG. 1, illustrating the generation of a saliency map in an image classification process.

The architecture of diagnostic tool 100 may also be applied to image classification models, as can be seen in FIG. 3. That is, activation maps and gradient maps may be generated, combined, and composited as described for test image 110 relative to FIG. 1, although the maps are generated in response to a classification decision operation (rather than a similarity decision operation). For application to image classification models, saliency maps may be applied to training images and classification test images, when there is no baseline image used for a similarity decision. An input image 310 of a cat, which corresponds to test image 110 of FIG. 1, is shown, along with a final layer saliency map 350L (corresponding to saliency map 150L), a layer L-1 saliency map 350L-1 (corresponding to saliency map 150L-1), a layer L-2 saliency map 350L-2 (corresponding to saliency map 150L-2), and a composite saliency map 350C, generated using saliency maps 350L, 350L-1, and 350L-2 (corresponding to saliency map 150C). As can be seen in FIG. 3, the use of the final three layers produces a well-defined region of interest surrounding the cat. This indicates that the classification model was properly trained.

FIG. 4 shows the application of diagnostic tool 100 to an e-commerce-related computer vision application. A website shows display 138, containing several items for sale, as presented to customer 148. The annotations regarding "Baseline Image" and scores, however, are for explanation and thus would likely not be shown by the website.) An image 412 (corresponding to baseline image 112 of FIG. 1) is an item that customer 148 has selected to view. The e-commerce-related computer vision application presents images of alternative products to customer 148, in the case that customer 148 might prefer something slightly different than what was originally selected.

The images of alternative products are scored for similarity and presented to customer 148 in display 138 based on ranking the similarity scores. As can be seen, an image 410a of an alternative product has a similarity score of 467, which is the highest score. This image 410a is presented in the prime location within display 138, immediately adjacent to image 412 of the selected product. Another image 410 of an identical product (although perhaps from a different supplier), is initially scored lower at 300, and so is presented in a less-favorable spot. In some scenarios, customer 148 may not even notice image 410, due to its placement further away from the prime location. The lower score of image 410, relative to image 410a, appears to be a suboptimal decision, because the similarity of the items within image 410 are more similar to the items within image 412 than are the items within image 410a. This may be because an initial score 422 (corresponding to first similarity score 122), with the value of 300, was created with an image that also showed a relatively large amount of confusing background.

Diagnostic tool 100 demonstrates a useful result by generating a saliency map 450C (corresponding to composite saliency map 150C), and passing saliency map 450C through ROI calculator 144 and cropping function 146, to produce a cropped image 416 (corresponding to cropped test image 116). A saliency map 452C (corresponding to composite saliency map 152C) is shown for comparison, to demonstrate that the ROIs in saliency maps 450C and 452C are similar. Upon re-submitting scoring cropped image 416 to deep learning model 102, a refined similarity score 426 (corresponding to refined similarity score 126) has a value of 588. This value is higher than the score of image 410a, so the ranking now places cropped image 416 (or, in its place, image 410) in the prime location within display 138. This provides customer 148 with an enhanced experience at the e-commerce website.

Figure 5:
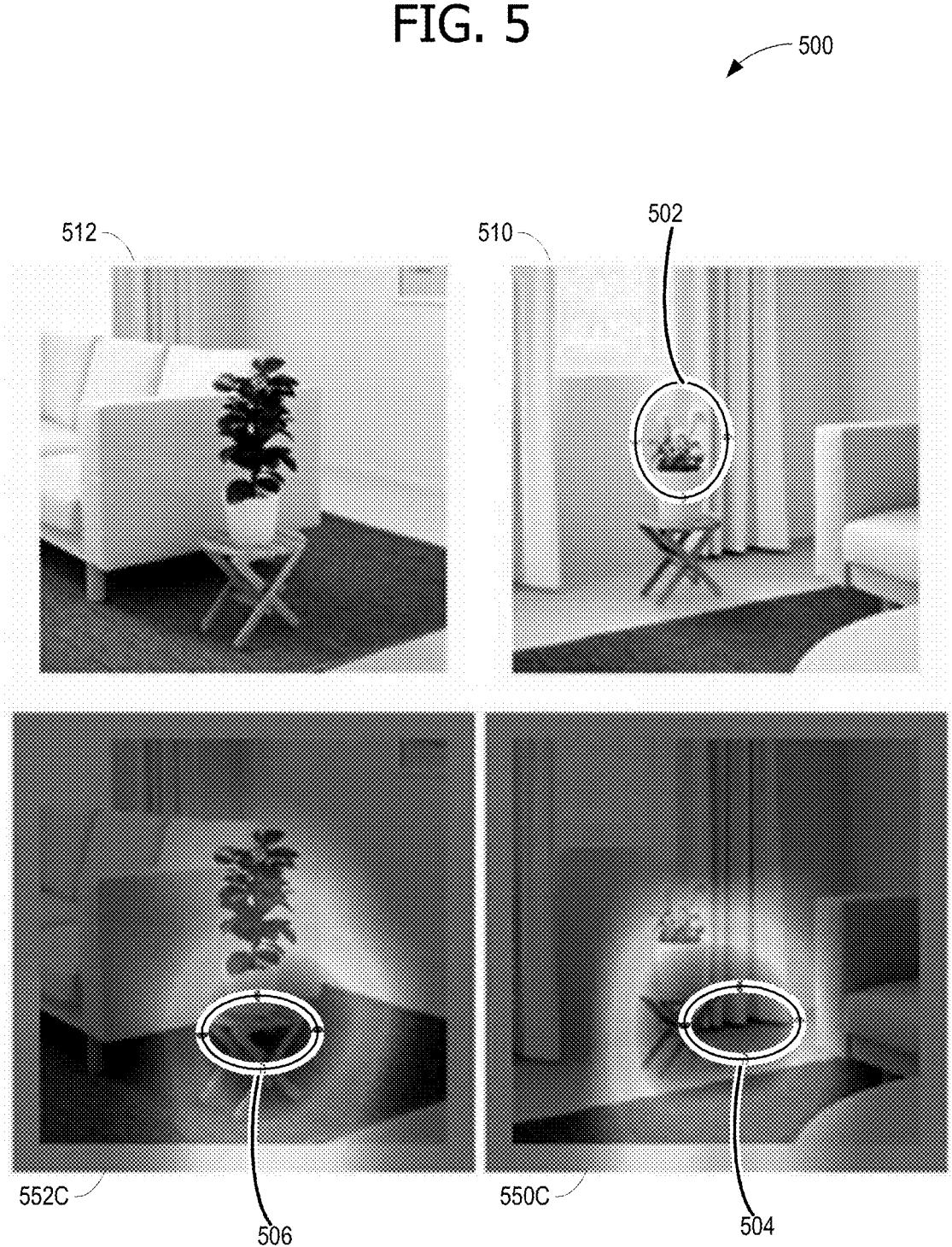
FIG. 5 also shows various images used and generated by the tool of FIG. 1; illustrating a diagnostic value of the tool.

FIG. 5 illustrates additional value of diagnostic tool 100. A test image 510 is tested for similarity with a baseline image 512. A human visual comparison of images 510 and 512 may produce an expectation that similarity results output from deep learning model 102 would be based on the presence of a plant 502 within image 510. However, this is not the case. By comparing a saliency map 552C for baseline image 512 with a saliency map 550C for test image 510, it can be seen that the similarity score is instead based largely on the presence of a shadow region 504 (under drapery, within test image 510) and the presence of a shadow region 506 (under a table, within baseline image 512). Such a result may not be intuitive to a human observer. This demonstrates the value of diagnostic tool 100 in identifying ML decision-making factors that may otherwise be hidden.

Figure 6:
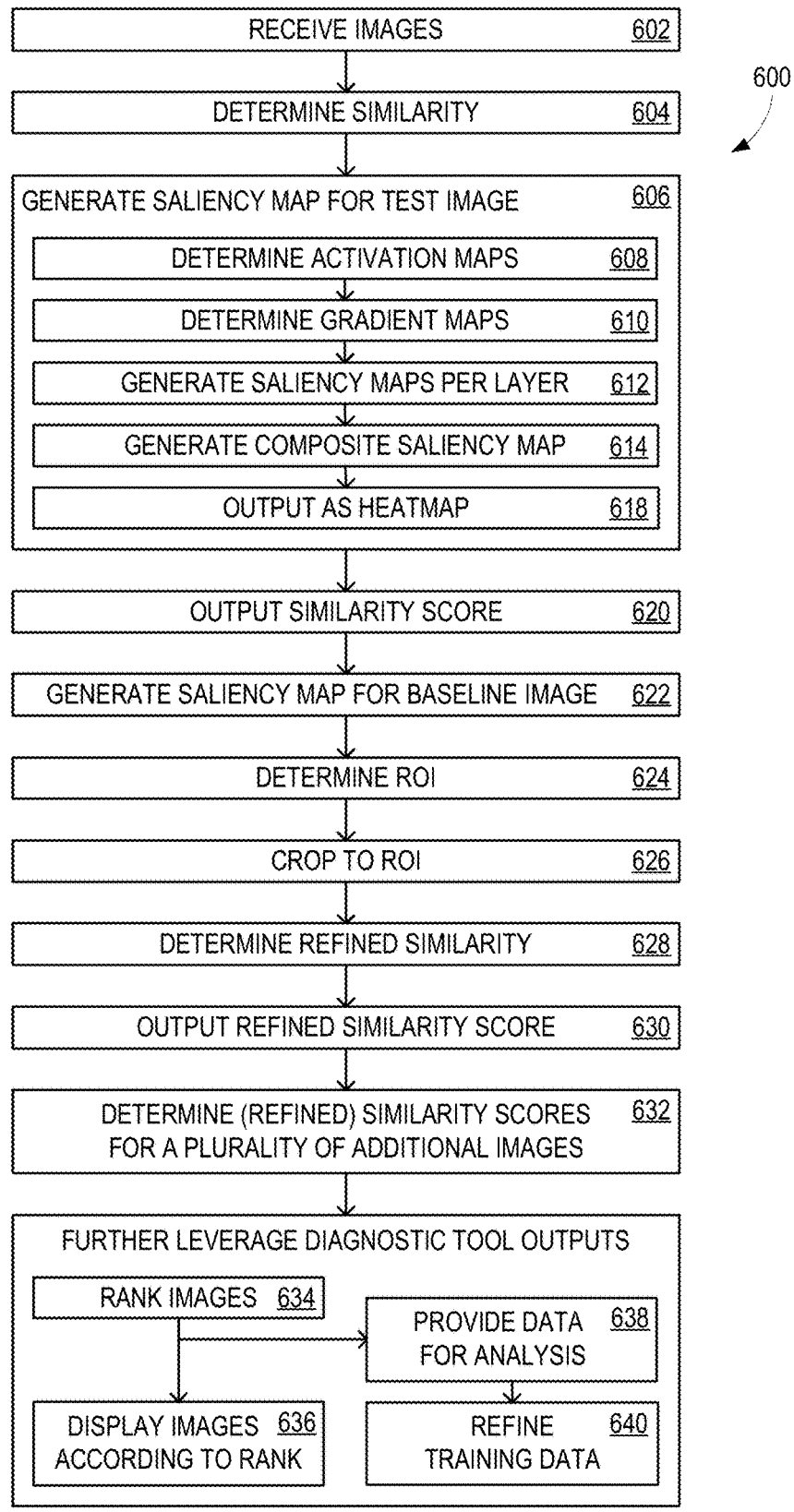
FIG. 6 is a flowchart illustrating exemplary operations performed using the tool of FIG. 1.

FIG. 6 is a flowchart 600 illustrating exemplary operations involved in generating a saliency map with diagnostic tool 100. In some examples, operations described for flowchart 600 are performed by computing device 800 of FIG. 8. Flowchart 600 commences with operation 602, which includes receiving a baseline image (e.g., baseline image 112) and a test image (e.g., test image 110). In some examples, operation 602 includes receiving a plurality of additional test images (e.g., additional test images 110a. Operation 604 includes determining, with a CNN (e.g., CNN 104), a first similarity (e.g., similarity result 120) between the baseline image and the test image. In some examples, the CNN comprises a portion of a similarity model. In some examples, the CNN comprises a residual CNN. In some examples, the CNN comprises 50 layers.

Operation 606 includes generating one or more saliency maps for the test image (e.g., one or more of saliency maps 150). To accomplish this, operation 606 includes operations 608-618. Operation 608 includes, based on at least determining the first similarity, determining, for the test image, a first activation map (e.g., activation map 130L) for at least one CNN layer. In some examples, determining the first activation map for at least one CNN layer comprises determining an activation map (e.g., activation map 130L) for at least a final CNN layer (e.g., layer L). In some examples, operation 608 also includes, determining, for the test image, a second activation map (e.g., activation map 130L-1) for a penultimate hidden CNN layer (e.g., layer L-1), and/or determining, for the test image, at least one inner layer activation map (e.g., activation map 130L-2) for at least one CNN layer prior to the penultimate hidden CNN layer (e.g., layer L-2). Other activation maps for other layers may also be determined.

Operation 610 is similar to operation 608, although for gradient maps. That is, operation 610 includes, based on at least determining the first similarity, determining, for the test image, a first gradient map (e.g., gradient map 140L) for the at least one CNN layer. In some examples, operation 610 also includes determining, for the test image, a second gradient map (e.g., gradient map 140L-1) for the penultimate hidden CNN layer, and/or determining, for the test image, at least one inner layer gradient map (e.g., gradient map 140L-2) for at least one CNN layer prior to the penultimate hidden CNN layer. Other gradient maps for other layers may also be determined.

Operation 612 generates the saliency maps by combining the activation maps and gradient maps. For example, operation 612 includes generating a first saliency map (e.g., saliency map 150L) as a first element-wise function of the first activation map and the first gradient map. In some examples, operation 612 also includes generating a second saliency map (e.g., saliency map 150L-1) as a first element-wise function of the second activation map and the second gradient map, and/or generating at least one inner layer saliency map (e.g., saliency map 150L-2) as an element-wise function of the at least one inner layer activation map and the at least one inner layer gradient map. In some examples, the element-wise function of the activation maps and the gradient maps comprises a Hadamard product. Other functions may instead be used.

Operation 614 generates composite saliency maps using saliency maps of two or more layers. For example, operation 614 includes generating a first composite saliency map (e.g., saliency map 150C) as an element-wise function of the first saliency map and the second saliency map. In some examples, operation 614 includes generating the first composite saliency map comprises performing the element-wise function for the first saliency map, the second saliency map, and the at least one inner layer saliency map. In some examples, a larger number of layer saliency maps may be used. In some examples, the element-wise function of the first saliency map and the second saliency map comprises an element-wise summation. Other functions may instead be used. Saliency maps may be converted to heatmaps in operation 618. That is, operation 618 includes 618 outputting the first composite saliency map as a heatmap image and/or outputting the first saliency map as a heatmap image, and/or outputting. Other saliency maps disclosed herein may also be represented as heatmap images. Operation 620 includes outputting a first similarity score (e.g., similarity score 122) based on at least the first similarity.

Operation 622 is similar to operation 606, although operation 622 generates saliency maps for the baseline image. That is, operation 622 includes, based on at least determining the first similarity, determining, for the baseline image, a third activation map (e.g., activation map 132L) for the at least one CNN layer, and determining, for the baseline image, a third gradient map (e.g., gradient map 142L) for the at least one CNN layer. Operation 622 further includes generating a third saliency map (e.g., saliency map 152L) as an element-wise function of the third activation map and the third gradient map. In some examples, determining the third saliency map comprises determining the third saliency map for at least the final CNN layer. Operation 622 may further include generating a second composite saliency map (e.g., saliency map 152C) as an element-wise function of the third saliency map and a saliency map generated for the baseline image using the penultimate hidden CNN layer (and/or additional inner layers of the CNN). Operation 622 may further include outputting the second composite saliency map as a heatmap image, outputting the third saliency map as a heatmap image, and outputting any other saliency maps for the baseline image as heatmap images.

Based on at least pixel values in the first saliency map, operation 624 determines an ROI (e.g., ROI 114) in the first saliency map, and/or the first composite saliency map. ROIs in other saliency maps may also or instead be determined. Operation 626 includes cropping the test image to an area corresponding to the ROI in the first saliency map or the first composite saliency image, thereby producing a cropped test image (e.g., cropped test image 116). Operation 628 includes determining, with the CNN, a refined similarity (e.g., refined similarity 124) between the baseline image and the cropped test image. This may involve repeating operation 604, but for the cropped test image rather than the original test image. Operation 630 includes outputting a refined similarity score (e.g., refined similarity score 126) based on at least the refined similarity between the baseline image and the cropped test image. If a plurality of plurality of additional test images had been received at 602, operation 632 includes determining, with the CNN, a plurality of similarity scores (e.g., scores 126a) for the plurality of additional test images, relative to the baseline image. This may involve performing operations 602 and 606, or (in some examples) operations 602, 606, and 624-628 for each image of the plurality of images.

Outputs of the diagnostic tool 100 may also be leveraged for value. For example, operation 634 includes ranking the test image and the plurality of additional test images according to the refined similarity score for the cropped test image and the plurality of similarity scores for the plurality of additional test images. In some examples, the plurality of similarity scores for the plurality of additional test images are also refined similarity scores, based on cropping the additional test images to their respective ROIs (as determined by an earlier similarity scoring process). Operation 636 includes displaying the test image (e.g., the entire original test image or the cropped portion of the test image) and at least a portion of the plurality of additional test images according to the ranking.

Other value includes enhancing the performance of the CNN. For example, operation 638 includes providing a saliency map (any of the saliency maps described herein), the ranking, the ROI, and/or similarity scores, to a diagnostic function (e.g., diagnostic function 156). Operation 640 includes providing refined training data for the CNN, based at least on output of the diagnostic function.

Figure 7:
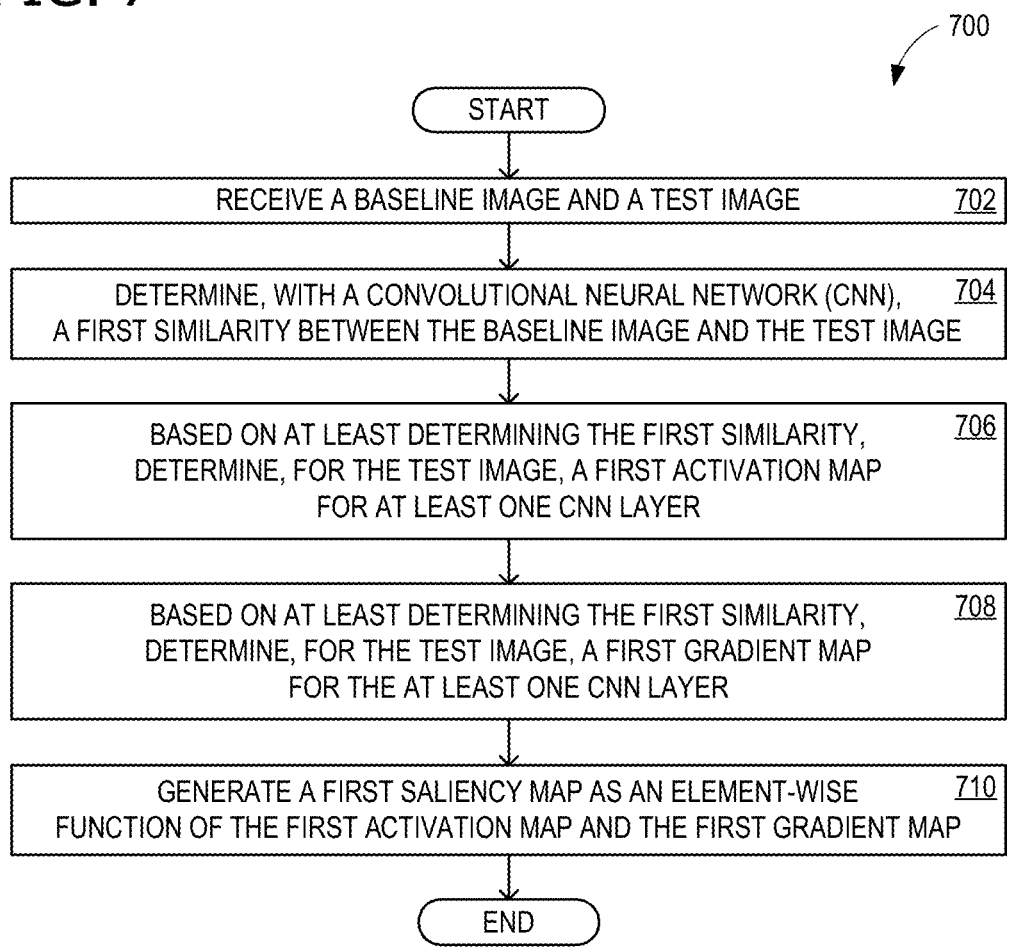
FIG. 7 is another flowchart illustrating exemplary operations performed using the tool of FIG. 1.

FIG. 7 is a flowchart 700, also illustrating exemplary operations involved in generating a saliency map with diagnostic tool 100. In some examples, operations described for flowchart 700 are performed by computing device 800 of FIG. 8. Flowchart 700 commences with operation 702, which includes receiving a baseline image and a test image. Operation 704 includes determining, with a CNN, a first similarity between the baseline image and the test image. Operation 706 includes, based on at least determining the first similarity, determining, for the test image, a first activation map for at least one CNN layer. Operation 708 includes, based on at least determining the first similarity, determining, for the test image, a first gradient map for the at least one CNN layer. Operation 710 includes generating a first saliency map as a first element-wise function of the first activation map and the first gradient map.

Additional Examples

An exemplary system for generating a saliency map for a computer vision application comprises: a processor; and a computer-readable medium storing instructions that are operative upon execution by the processor to: receive a baseline image and a test image; determine, with a CNN, a first similarity between the baseline image and the test image; based on at least determining the first similarity, determine, for the test image, a first activation map for at least one CNN layer; based on at least determining the first similarity, determine, for the test image, a first gradient map for the at least one CNN layer; and generate a first saliency map as a first element-wise function of the first activation map and the first gradient map.

An exemplary method of generating a saliency map for a computer vision application comprises: receiving a baseline image and a test image; determining, with a convolutional neural network (CNN), a first similarity between the baseline image and the test image; based on at least determining the first similarity, determining, for the test image, a first activation map for at least one CNN layer; based on at least determining the first similarity, determining, for the test image, a first gradient map for the at least one CNN layer; and generating a first saliency map as a first element-wise function of the first activation map and the first gradient map.

One or more computer storage devices having computer-executable instructions stored thereon, which, on execution by a computer, cause the computer to perform operations comprising: receiving a baseline image and a test image; determining, with a convolutional neural network (CNN), a first similarity between the baseline image and the test image; based on at least determining the first similarity, determining, for the test image, a first activation map for at least one CNN layer; based on at least determining the first similarity, determining, for the test image, a first gradient map for the at least one CNN layer; and generating a first saliency map as a first element-wise function of the first activation map and the first gradient map.

Alternatively, or in addition to the other examples described herein, examples include any combination of the following:

the first element-wise function of the first activation map and the first gradient map comprises a Hadamard product;

based on at least pixel values in the first saliency map, determining a region of interest (ROI) in the first saliency map;

cropping the test image to an area corresponding to the ROI in the first saliency map;

determining, with the CNN, a refined similarity between the baseline image and the cropped test image;

outputting a refined similarity score based on at least the refined similarity between the baseline image and the cropped test image;

determining, with the CNN, a plurality of similarity scores for a plurality of additional test images, relative to the baseline image;

ranking the test image and the plurality of additional test images according to the refined similarity score for the cropped test image and the plurality of similarity scores for the plurality of additional test images;

based on at least determining the first similarity, determining, for the test image, a second activation map for a penultimate hidden CNN layer;

based on at least determining the first similarity, determining, for the test image, a second gradient map for the penultimate hidden CNN layer;

generating a second saliency map as a second element-wise function of the second activation map and the second gradient map;

generating a first composite saliency map as a third element-wise function of the first saliency map and the second saliency map;

the element-wise function of the first saliency map and the second saliency map comprises an element-wise summation;

based on at least determining the first similarity, determining, for the baseline image, a third activation map for the at least one CNN layer;

based on at least determining the first similarity, determining, for the baseline image, a third gradient map for the at least one CNN layer; and generating a third saliency map as a fourth element-wise function of the third activation map and the third gradient map;

determining the first activation map for at least one CNN layer comprises determining an activation map for at least a final CNN layer;

determining the first gradient map for at least one CNN layer comprises determining an activation map for at least a final CNN layer;

based on at least determining the first similarity, determining, for the test image, at least one inner layer activation map for at least one CNN layer prior to the penultimate hidden CNN layer;

based on at least determining the first similarity, determining, for the test image, at least one inner layer gradient map for at least one CNN layer prior to the penultimate hidden CNN layer;

generating at least one inner layer saliency map as an element-wise function of the at least one inner layer activation map and the at least one inner layer gradient map;

generating the first composite saliency map comprises performing the element-wise function for the first saliency map, the second saliency map, and the at least one inner layer saliency map.

generating a second composite saliency map as an element-wise function of the third saliency map and a saliency map generated for the baseline image using the penultimate hidden CNN layer;

outputting a first similarity score based on at least the first similarity;

outputting the first saliency map as a heatmap image;

outputting the first composite saliency map as a heatmap image;

outputting the second composite saliency map as a heatmap image;

the CNN comprises a portion of a similarity model;

the CNN comprises a residual CNN; and the CNN comprises 50 layers.

While the aspects of the disclosure have been described in terms of various examples with their associated operations, a person skilled in the art would appreciate that a combination of operations from any number of different examples is also within scope of the aspects of the disclosure.

Example Operating Environment

Figure 8:
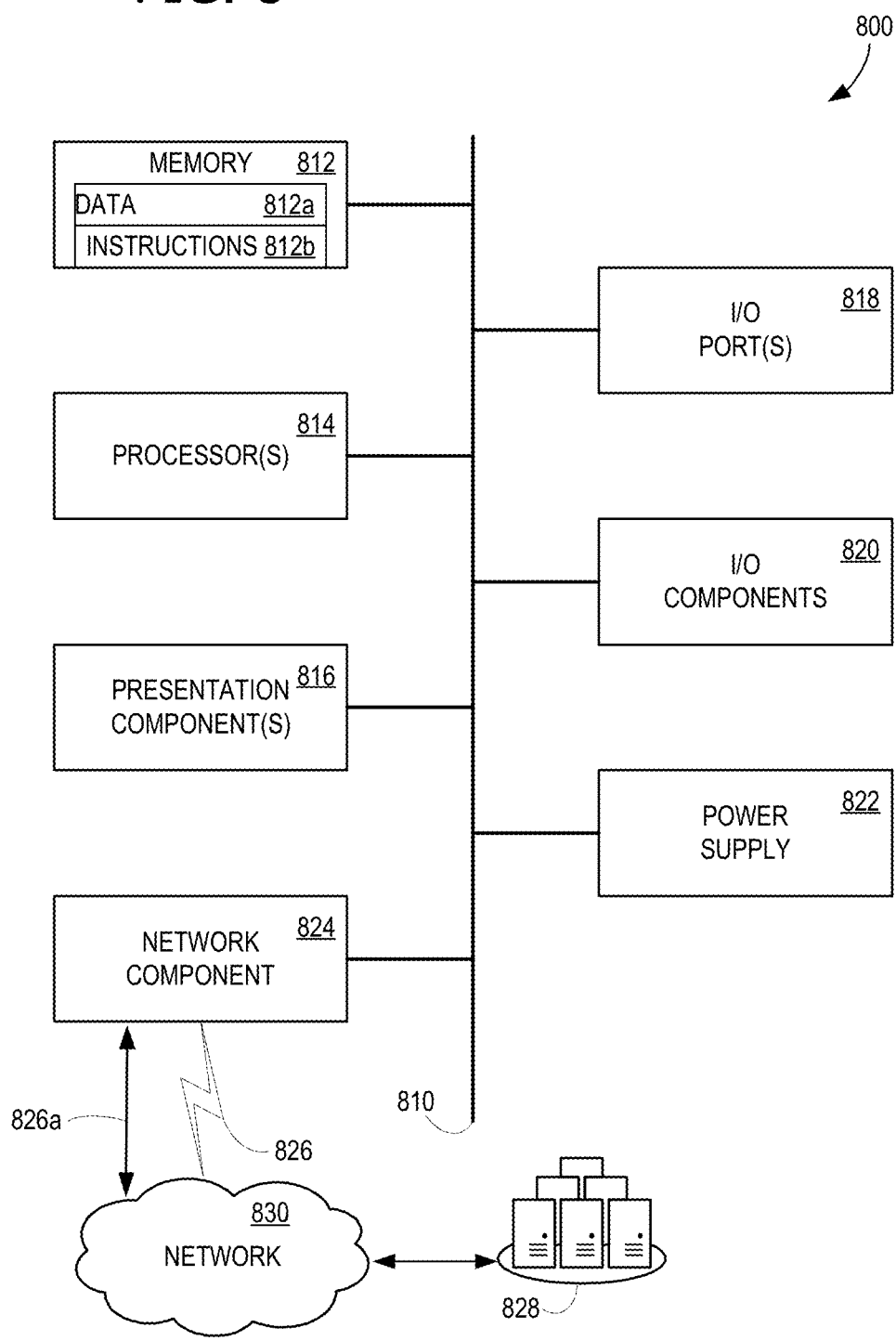
FIG. 8 is a block diagram of an example computing environment suitable for implementing some of the various examples disclosed herein.

FIG. 8 is a block diagram of an example computing device 800 for implementing aspects disclosed herein, and is designated generally as computing device 800. Computing device 800 is but one example of a suitable computing environment and is not intended to suggest any limitation as to the scope of use or functionality of the examples disclosed herein. Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer-storage memory 812, one or more processors 814, one or more presentation components 816, I/O ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more buses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer-storage media references below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein.

In some examples, memory 812 includes computer-storage media in the form of volatile and/or nonvolatile memory, removable or non-removable memory, data disks in virtual environments, or a combination thereof. Memory 812 may include any quantity of memory associated with or accessible by the computing device 800. Memory 812 may be internal to the computing device 800 (as shown in FIG. 8), external to the computing device 800 (not shown), or both (not shown). Examples of memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 800. Additionally, or alternatively, the memory 812 may be distributed across multiple computing devices 800, for example, in a virtualized environment in which instruction processing is carried out on multiple devices 800. For the purposes of this disclosure, "computer storage media," "computer-storage memory," "memory," and "memory devices" are synonymous terms for the computer-storage memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represents an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

The computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor;
a computer-readable medium storing instructions;
the instructions stored on the computer-readable medium executed by the processor to:
receive a test image;
determine, with an image classifier, an image classification of the test image;
determine, for the test image, a first activation map for at least one model layer using the determined image classification;
determine, for the test image, a first gradient map for the at least one model layer using the determined image classification; and
generate a first saliency map as a first element-wise function of the first activation map and the first gradient map.

2. The system of claim 1, wherein the instructions are further operative to:
determine a region of interest (ROI) in the first saliency map;
crop the test image to an area corresponding to the determined ROI; and
determine a refined image classification.

3. The system of claim 1, wherein the at least one model layer is prior to a penultimate hidden layer.

4. The system of claim 1, wherein the first element-wise function of the first activation map and the first gradient map comprises a Hadamard product.

5. The system of claim 1, wherein the instructions are further operative to:
output the first saliency map as a heatmap image.

6. The system of claim 1, wherein the instructions are further operative to:
determine, for the test image, a second activation map using the determined image classification;
determine, for the test image, a second gradient map using the determined image classification;
generate a second saliency map as a second element-wise function of the second activation map and the second gradient map; and
generate a composite saliency map as a third element-wise function of the first saliency map and the second saliency map.

7. The system of claim 6, wherein the instructions are further operative to:
output the composite saliency map as a heatmap image.

8. A method comprising:
receiving a test image;
determining, with an image classifier, an image classification of the test image;

determining, for the test image, a first activation map for at least one model layer using the determined image classification;

determining, for the test image, a first gradient map for the at least one model layer using the determined image classification; and generating a first saliency map as a first element-wise function of the first activation map and the first gradient map.

9. The method of claim 8, further comprising:

determining a region of interest (ROI) in the first saliency map;

cropping the test image to an area corresponding to the determined ROI; and determining a refined image classification.

10. The method of claim 8, wherein the at least one model layer is prior to a penultimate hidden layer.

11. The method of claim 8, wherein the first element-wise function of the first activation map and the first gradient map comprises a Hadamard product.

12. The method of claim 8, further comprising:

outputting the first saliency map as a heatmap image.

13. The method of claim 8, further comprising:

determining, for the test image, a second activation map using the determined image classification;

determining, for the test image, a second gradient map using the determined image classification;

generating a second saliency map as a second element-wise function of the second activation map and the second gradient map; and generating a composite saliency map as a third element-wise function of the first saliency map and the second saliency map.

14. The method of claim 3, further comprising:

outputting the composite saliency map as a heatmap image.

15. One or more computer storage devices having computer-executable instructions stored thereon, which, on execution by a computer, cause the computer to perform operations comprising:

receiving a test image;

determining, with an image classifier, an image classification of the test image;

determining, for the test image, a first activation map for at least one model layer using the determined image classification;

determining, for the test image, a first gradient map for the at least one model layer using the determined image classification; and generating a first saliency map as a first element-wise function of the first activation map and the first gradient map.

16. The one or more computer storage devices of claim 15, wherein the operations further comprise:

determining a region of interest (ROI) in the first saliency map;

cropping the test image to an area corresponding to the determined ROI; and determining a refined image classification.

17. The one or more computer storage devices of claim 15, wherein the at least one model layer is prior to a penultimate hidden layer.

18. The one or more computer storage devices of claim 15, wherein the first element-wise function of the first activation map and the first gradient map comprises a Hadamard product.

19. The one or more computer storage devices of claim 15, wherein the operations further comprise:

outputting the first saliency map as a heatmap image.

20. The one or more computer storage devices of claim 15, wherein the operations further comprise:

determining, for the test image, a second activation map using the determined image classification;

determining, for the test image, a second gradient map using the determined image classification;

generating a second saliency map as a second element-wise function of the second activation map and the second gradient map; and generating a composite saliency map as a third element-wise function of the first saliency map and the second saliency map.

* * * * *